United States Patent [19]
Siminovitch

[11] Patent Number: 6,128,431
[45] Date of Patent: Oct. 3, 2000

[54] HIGH EFFICIENCY SOURCE COUPLER FOR OPTICAL WAVEGUIDE ILLUMINATION SYSTEM

[75] Inventor: Michael J. Siminovitch, Pinole, Calif.

[73] Assignee: The Regents of the University of California, Oakland, Calif.

[21] Appl. No.: 09/169,021

[22] Filed: Oct. 8, 1998

Related U.S. Application Data

[60] Provisional application No. 60/061,417, Oct. 8, 1997.

[51] Int. Cl.[7] ................................. G02B 6/00; F21V 9/00
[52] U.S. Cl. ............................................ 385/147; 362/511
[58] Field of Search ............................... 385/147; 362/511

[56] References Cited

U.S. PATENT DOCUMENTS

| | | | |
|---|---|---|---|
| 4,958,263 | 9/1990 | Davenport et al. | 362/32 |
| 5,187,412 | 2/1993 | El-Hamamsy et al. | 315/248 |
| 5,452,186 | 9/1995 | Dassanayake | 362/80 |

*Primary Examiner*—Frank G. Font
*Assistant Examiner*—Armando Rodriguez
*Attorney, Agent, or Firm*—Henry P. Sartorio

[57] ABSTRACT

A fiber optic or optical waveguide illumination system includes a source coupling system. The source coupling system includes an optical channel with an internal cavity. A light source is disposed inside the driving circuit. Coupling losses are minimized by placing the light source within the optical channel. The source cavity and the source optical channel can be shaped to enhance the amount of light captured in the channel by total internal reflection. Multiple light distribution waveguides can be connected to the source coupling channel to produce an illumination system.

20 Claims, 4 Drawing Sheets

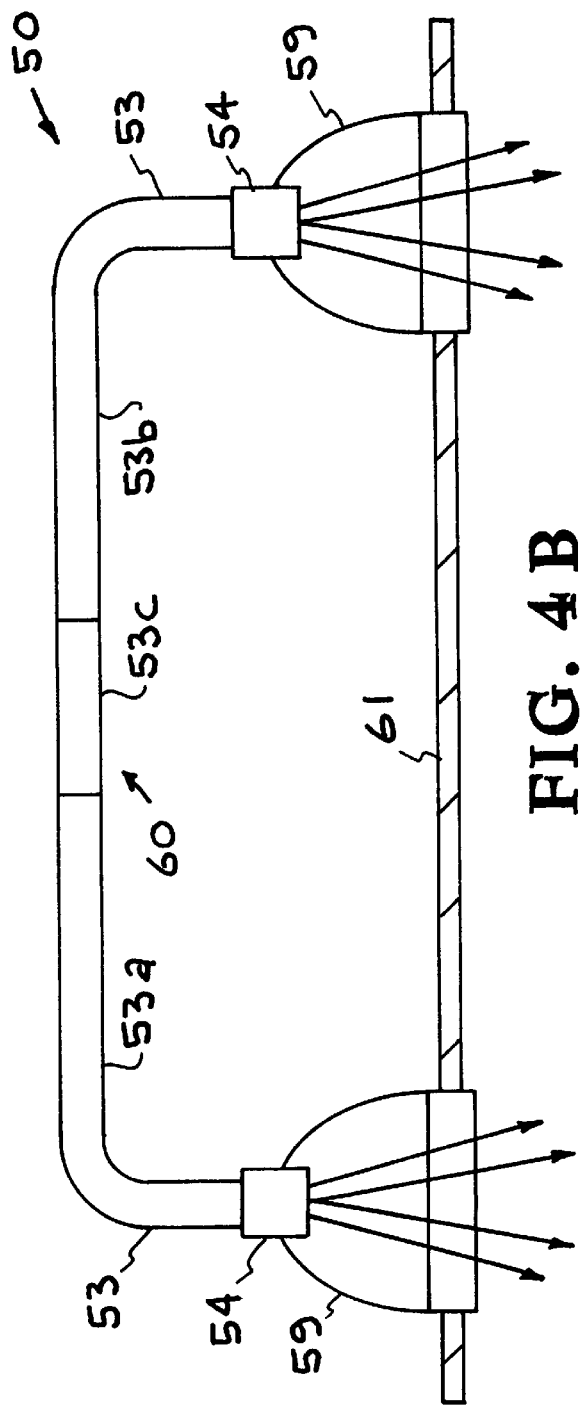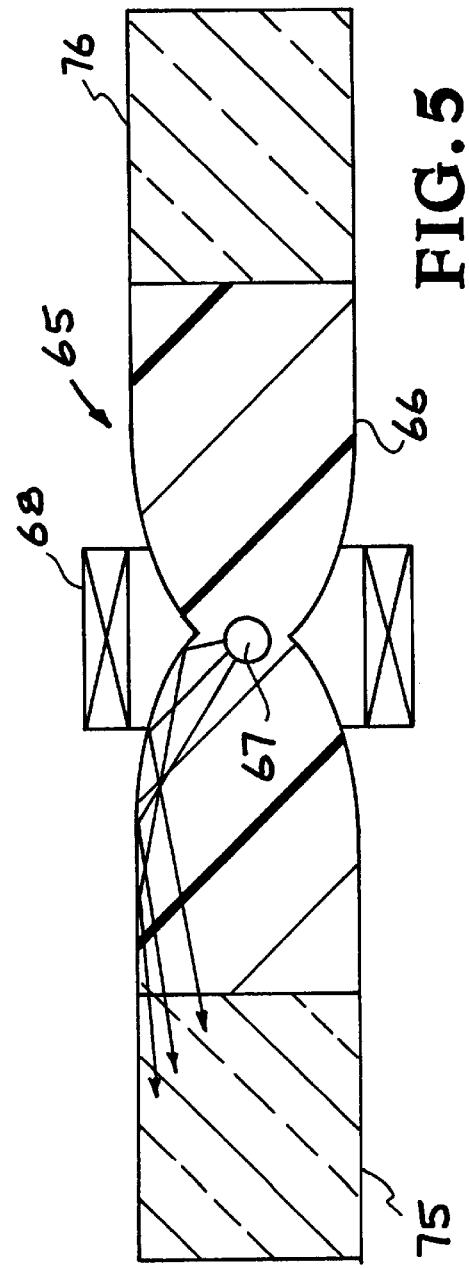

HIGH EFFICIENCY SOURCE COUPLER FOR OPTICAL WAVEGUIDE ILLUMINATION SYSTEM

RELATED APPLICATIONS

This application claims priority of Provisional Application Ser. No. 60/061,417 filed Oct. 8, 1997.

STATEMENT OF GOVERNMENT INTEREST

This invention was made pursuant to contract No. DE-AC03-76SF00098 between the U.S. Department of Energy and the University of California. The U.S. Government retains certain rights in this invention.

BACKGROUND OF THE INVENTION

1. Field of the Invention

The present invention relates generally to the field of illumination and lighting systems, and more particularly to fiber optic or optical waveguide light distribution systems.

2. Description of the Related Art

In 1870, British physicist John Tyndall demonstrated that light could be guided within a water jet through the phenomenon of total internal reflection (TIR). Fiber optics or optical fibers are long, thin, flexible fibers of glass, plastic, or other transparent materials through which light is transmitted using TIR. Because of TIR, light admitted at one end of the fiber can travel through the fiber with very low loss, even if the fiber is curved. Fiber optics are one type of optical waveguide which is a more general class of optical transmission element using TIR.

The phenomenon of total internal reflection (TIR) is central to the operation of fiber optics (and other optical waveguides). Light traveling inside the optical fiber center, or core, which strikes the outside surface (interface) at an angle of incidence greater than the "critical angle" is reflected back toward the inside of the fiber substantially without loss (if defects or impurities in the fiber are ignored). Thus, light can be transmitted over long distances by being repeatedly reflected inwardly thousands of times. In order to avoid losses inherent in real world optical fibers through the scattering of light by impurities or defects on the surface of the fiber, the optical fiber core is clad with a glass or other layer having a much lower refractive index (if no cladding material is placed on the core, then the external environment is the clad). The internal reflections then occur at the interface of the high refractive index glass fiber and the lower refractive index cladding. The critical angle $A_c$ above which TIR occurs, measured from the normal to the core/clad interface is determined by the relative refractive indexes of the core and clad (or surrounding environment), i.e. $\sin A_c = n_{clad}/n_{core}$. Thus for TIR to occur, the index of the core must be greater than the index of the surrounding material, and the ratio of the indexes defines the range of angles at which TIR will occur.

Communications engineering has exploited the information carrying capacity or bandwidth of optical fibers by creating communication networks and backbones of optical fibers. Fiber optics is the transmission medium of choice for many cutting edge applications, such as the communication systems linking the computers on Boeing's new 777 jumbo jet and the communication system aboard NASA's new Freedom International Space Station.

However, communication engineering is not the only beneficiary of advances in optical fiber technology. It has become clear that future trends in illumination engineering point to an increasing use of fiber optic or optical waveguide light distribution systems for industrial and home lighting applications.

Currently, the major barriers to the widespread application of optical fiber or optical waveguide systems are high cost and low efficiency. If a higher efficiency light distribution system could be devised, the technology would gain a wider acceptance and increased use.

Coupling losses are the major cause of the low efficiency in conventional fiber optic and other optical waveguide illumination systems. Since transmission losses are low, losses in light in a fiber optic illumination system are mainly a function of the coupling efficiency (or inefficiency) between the external light source and the fiber optic or waveguide distribution system. In conventional systems, an optical reflector, lens or other concentrating system focuses or concentrates the light flux from the source onto the interface of the fiber optic system. The primary losses appear at the source/reflector interface and at the optical system interface. This coupling efficiency can typically be on the order of 50–70%. These sources of losses are, therefore, the primary obstacle to overcome if fiber optic or optical waveguide systems are to become widespread in the lighting of interiors.

What is needed, therefore, is a means and a system for overcoming the losses occurring at the source/reflector interface and the coupling losses that occur between the source of light and the fiber optics or the solid light guide distribution system.

SUMMARY OF THE INVENTION

It is, therefore, an object of the present invention to provide a source coupling system that will greatly increase the efficiency of fiber optic or optical waveguide distribution systems.

It is another object of the invention to provide a source coupling system without the losses that occur in conventional systems at the interface between the light source and the optical elements, such as reflectors and lenses, that are used to transfer the light flux from the source into the fiber optic channeling system.

It is also an object of the invention to provide a source coupling system for increasing the amount of source light which enters the optical fiber or waveguide distribution system and is totally internally reflected therein.

The present invention is a high efficiency source coupling system for an optical waveguide illumination system. The coupling system includes an optical waveguide or channel, with a cavity formed therein, and a light source disposed inside the cavity. Since the light source is internal to the optical channel, more of the light is captured inside the channel. The source cavity and channel can be shaped to increase the amount of light that is totally internally reflected. A light source driving circuit is operatively associated with the coupling system. An advantage of this configuration and structure is that coupling losses are minimized by placing the light source within the optical channel.

The coupling system optical channel may be made of quartz, glass, plastic, or other suitable materials. The coupling system optical channel may be a portion of a light distribution system waveguide, i.e., the coupling system is formed integrally in a portion of a long optical channel or waveguide which forms the distribution system. Alternatively, the coupling system optical channel may be a separate element which is connected to optical fibers or waveguides of the distribution system.

The light source is preferably a high-intensity discharge (HID) light source, particularly an electrodeless HID light source. The HID light source may be a metal halide, mercury, sodium or sulfur light source. The metal halide light source may be a thallium, indium, or sodium halide light source. If the light source is an HID light source, the optical channel is preferably a quartz optical channel which is stable in the presence of the high temperatures generated by the HID light source.

BRIEF DESCRIPTION OF THE DRAWING

FIGS. 4A, 4B illustrate an illumination system of the present invention wherein a single centrally located light source is integrally formed in an optical light distribution channel connected to two separately located ceiling-mounted downlights.

FIG. 5 shows a light source coupling system of the invention having a shaped optical channel to increase total internal reflection.

DETAILED DESCRIPTION OF THE INVENTION

Figure 1:
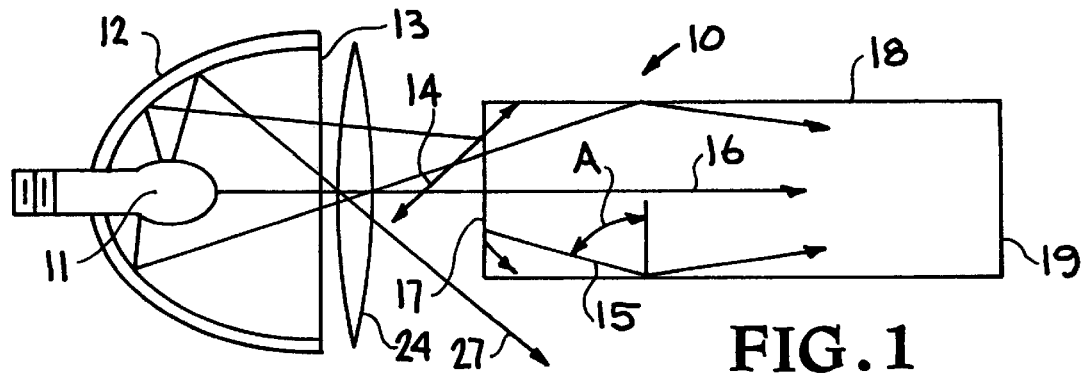
FIG. 1 illustrates a prior art interface between an external light source and a fiber optic or optical waveguide illumination system.

A conventional light source-optical channel system interface 10, shown in FIG. 1, has a light source 11, and a surrounding reflector 12, such as is found in many automobile headlamps. The interior of the reflector 12 is coated with a highly reflective material, so as to cause a large proportion of the light flux emitted by the light source 11 to be concentrated and directed toward the opening 13 of the reflector 12. Optical waveguide 18, which may be a fiber optic cable, a bundle of fiber optics, or any other solid light guide, is positioned to receive light from source 11/reflector 12. For convenience, all such types of optical waveguides will be, hereinafter, collectively referred to as an optical channel.

Optical channel 18 has a proximal end 17 closest to the light source 11 and a distal end 19 farthest away from the light source 11. Because of the imperfectly reflective surface of the inside of the reflector 12, not all of the light flux emitted by the light source 11 makes it out of the opening 13 of the reflector 12. This accounts for a portion of the coupling losses between the light source 11 and the optical channel 18. Furthermore, because of the partially reflective nature of the proximal end 17 of the optical channel 18, another portion of the light flux if reflected away from the proximal end 17 of the optical channel, as shown by reflected ray 14. Furthermore because of the typical mismatch in the relative sizes of source 11/reflector 12 and optical channel 18, some of the light from source 11, as shown by ray 27, does not even fall on distal end 17 and thus is totally lost. One way to get more light into optical channel 18 is to add a lens or other focusing element 24 between source 11/reflector 12 and channel 18. The portion of the light flux that does not enter into the optical channel, either by missing end 17 or being reflected at end 17, accounts for most of the coupling losses between the light source 11 and the optical channel 18.

The light flux not scattered within the interior of the reflector 12, not lost by missing the proximal end 17 of channel 18, and not reflected at the proximal end 17 of the optical channel 18 enters the optical channel 18 at various angles, such as shown by rays 15 and 16 traveling within the optical channel 18. Due to the phenomenon of total internal reflection, the light rays 15 that are incident upon the outer surface of the optical channel 18 at an angle of incidence $A \geq A_c$ are reflected back toward the interior of the optical channel 18. These reflections constrain the path of the light to within the optical channel 18 as they propagate toward distal end 19 of the optical channel 18. Ray 16 is propagating directly down channel 18.

Overcoming these sources of losses, i.e. losses at the interface between the light source 11 and reflector 12, and losses at the interface between the light source 11 and proximal end 17 of optical channel 18, would drastically improve the efficiency of the light distribution system.

Figure 2:
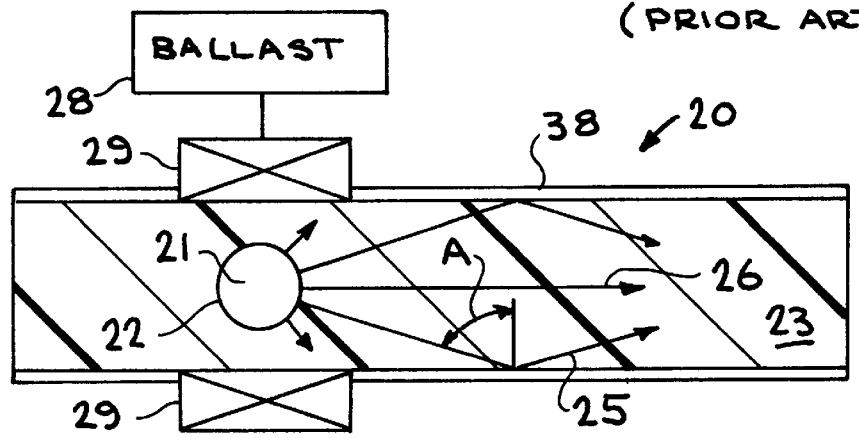
FIG. 2 illustrates a light source coupling system according to the present invention for a fiber optic or optical waveguide illumination system.

FIG. 2 shows a source coupling system 20 according to the present invention, for better coupling of source light into an optical waveguide illumination system. Coupling system 20 is formed of an optical channel 23 which is an optical waveguide analogous to optical waveguide 18 of FIG. 1. Optical channel 23 is typically made of a low cost material such as plastic but may also be made of quartz or glass or other suitable material, and is transmissive at the source wavelength. Source channel 23 may be a relatively short discrete component which can be coupled to the longer distribution waveguides of the illumination system or it may be formed integrally in a portion of a distribution waveguide. Optical channel 23 may be any type of waveguide, e.g. step-index or gradient-index. Optical channel 23 may be surrounded by a lower refractive index cladding layer 38 whose refractive index and that of channel 23 determine the critical angle for TIR in channel 23.

A cavity 22 is formed within the optical channel 23. The shape of cavity 22 may be spherical, as shown, or elliptical or other shape. A light source 21, e.g. a material which can be excited to emit light, is disposed within cavity 22. The cavity 22 surrounds the light source 21; thus channel 23 must be large enough to contain cavity 22. Cavity 22 is formed by conventional methods.

Surrounding the coupling system 20 in the vicinity of cavity 22 is an induction driving system 29 for energizing light source 21. Induction system 29 is connected to a ballast 28 which limits current through the induction system 29 and the temperature of light source 21, and comprises ignition circuitry that is known in the art.

Light source 21 may be a high intensity discharge (HID) light source, particularly an electrodeless HID light source. The cavity 22 forms the body of the HID light source. The HID light source 21 may be a mercury, metal halide, sodium, xenon, or sulfur light source. As is know, a mercury HID light source is an electric discharge light source in which the major portion of the radiation is produced by the excitation of mercury atoms. Metal halide HID sources are light sources in which the light is produced by the radiation from an excited mixture of metallic vapor (usually mercury) and the products of disassociation of halides, such as halides of thallium, indium, or sodium. High-pressure sodium HID light sources are light sources in which the radiation is produced by the excitation of sodium vapor. Xenon light sources produce light by excitation of xenon atoms. Sulfur HID lamps are electric discharge light sources which excite sulfur atoms. Although HID light sources are preferred, the present invention if by no means limited thereto. Any light source which may be embedded within channel 23 may by used.

The structure of the source coupling system shown in FIG. 2 enjoys a far greater coupling efficiency as compared to the conventional system shown in FIG. 1. By placing the light source 21 internally within the (waveguide) channel 23, all of the flux produced by the light source is generated within the optical channel. Reflector 12 and proximal end 17 of waveguide 18 of the prior art system of FIG. 1 are totally eliminated. Therefore, the system shown in FIG. 2 does not suffer from the same problems associated with the FIG. 1 prior art system of coupling externally generated light into optical waveguides of an illumination system. Placing the light source within the optical channel allows for very high coupling efficiencies, therefore, as it eliminates the traditional loss mechanisms associated with conventional external couplers.

Figure 3:
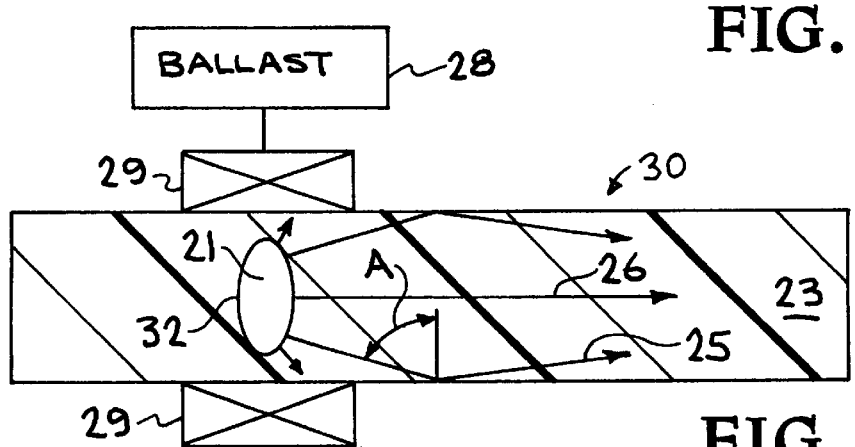
FIG. 3 shows another embodiment of the present invention, using an elliptically shaped light source.

More of the flux of the light source 21, illustrated in FIG. 2 by light rays 25 and 26, that originates in channel 23 remains within the optical channel 23. Any off axis light rays 25 which are incident on the clad 38/channel (core) 23 interface at an angle $A \geq A_c$ will be totally internally reflected. On axis rays 26 of course will remain in channel 23. The cavity 22 can be shaped to allow an even more efficient distribution of flux within the optical channel. The cavity may be a spherical cavity 22 as in FIG. 2 or may be an elliptical cavity 32, as shown in FIG. 3, or other shape. The spherical cavity produces an isotropic light distribution so that more light will be lost, i.e. more of the light rays will not be at the critical angle. The elliptical shape of the cavity 32 acts as a convex lens that directs the flux 25, 26 at favorable angles within the optical channel 23, i.e. the nonisotropic distribution of the light allows more light to be totally internally reflected. All other structures of the source coupling system 30 in Fig. 3 are similar to the corresponding structures in FIG. 2. Thus any nonisotropic source 21 formed in channel 23 which produces more light which will be totally internally reflected will increase source coupling efficiency.

All light sources generate heat. HID light sources, in particular, generate a great deal of thermal energy. To insure that the optical channel 23 is stable in the presence of the heat generated by the HID light source 21, the region of the optical channel adjacent to the light source is preferably made of quartz or other thermally stable material. Further away from the light source 21, plastic or glass material may be used, where the temperature stresses on the material are lessened. For example, plastic or glass optical fibers or other solid light guides may be coupled to the distal end (away from the light source) of the coupling channel. As further described below, the coupling channel 23 may be an integral portion of the entire light distributing waveguide or it may be a separate component to which other light distributing waveguides are efficiently coupled.

Figure 4A:
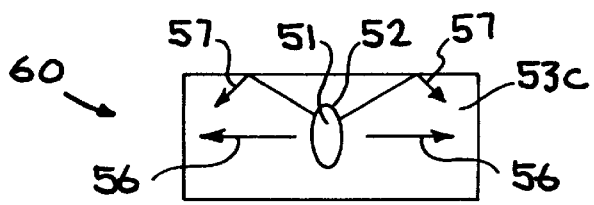

An illumination system 50 according to the present invention is shown in FIGS. 4A, B. An optical coupling system 60, similar to systems 20 or 30, is disposed integrally in a portion 53c of an optical channel 53 which forms the distribution channel for the illumination system 50. The optical coupling system 60 comprises a cavity 52 that is formed within the optical channel 53. The cavity 52 forms the body of light source 51, such as an electrodeless HID light source. Substantially, all of the flux generated by the light source 51 remains within the optical channel 53, as shown by rays 56 and 57. In the illustrated embodiment, approximately half of the flux travels within one branch 53a of the optical channel, while the other half of the flux travels within the other branch 53b of the optical channel 53. Branches 53a, b are the portions of channel 53 on either side of source coupler portion 53c. The light generated by the light source 51 is, therefore, approximately equally distributed between the two branches of the optical channel 53, with greatly reduced coupling losses. The distal ends of the optical channel 53 are coupled to end members that include an output device 54 and a downlamp or lighting fixture 59. The output device 54 may be a lens or diffuser. The downlamp 59 may be a reflector, a diffuser, or a combination of these. The downlamps may be mounted flush with a ceiling 61 of an interior structure, or mounted in another fashion, as those of skill in this art will readily recognize. Of course, the distal ends of channels 53 may be positioned in ceiling 61 without use of output devices 54 and fixtures 59.

As with embodiments shown in FIGS. 2 and 3, the illumination system of FIGS. 4A, B enjoys a far greater coupling efficiency, as compared to the conventional architecture shown in FIG. 1. More of the flux generated by the light source 51 inside the cavity 52 disposed inside the optical channel 53 remains within the optical channel than can be coupled from an external source.

The high efficiency coupling system according to the present invention may form the backbone of a standard interior illumination layout using fiber optics or other optical waveguides. The present invention will undoubtedly be of great use in the development of centralized light distribution systems. The illumination system according to the present invention could serve multiple light fixtures or downlights, from a single centrally located light source.

The cavity of the source coupling system can be shaped to promote TIR, as shown in FIG. 3, in a coupling channel of uniform diameter. The coupling channel can also be shaped to increase the amount of light flux from the source that will be totally internally reflected, and thus trapped within the optical waveguide light distribution system. As shown in FIG. 5, a source coupling system 65 is formed of a tapered optical channel or waveguide 66. Source cavity 67 is formed in channel 66 to contain the light source as described above. The cavity 67 is positioned at the narrowest part of channel 66, and an induction ring 68 surrounds the channel 66 to power the light source. The channel 66 tapers outwardly for a distance from cavity 67 so that more of the light rays from cavity 67 will strike the channel surface (interface) at angles greater than the critical angle for TIR. Thus by a combination of both shaping the coupling channel and shaping the source cavity in the coupling channel to achieve optimum conditions for TIR, more of the source light can be directed into the light distribution system, providing greater efficiency.

As illustrated previously, the coupling channel is essentially linear, so that light may be directed from the coupling channel in two directions, as shown in FIG. 4B. However, the coupling channel may be formed with a more complex shape, e.g. the four-way source coupling system 70 of FIG. 6A. Coupling system 70 is formed of an optical channel 71 which has four (tapered) arms 71 *a, b, c, d* which extend from a central portion at which the source cavity 72 is located. Induction driving system 73 is positioned around the central portion of channel 71 to energize a light source in cavity 72.

Figure 7:
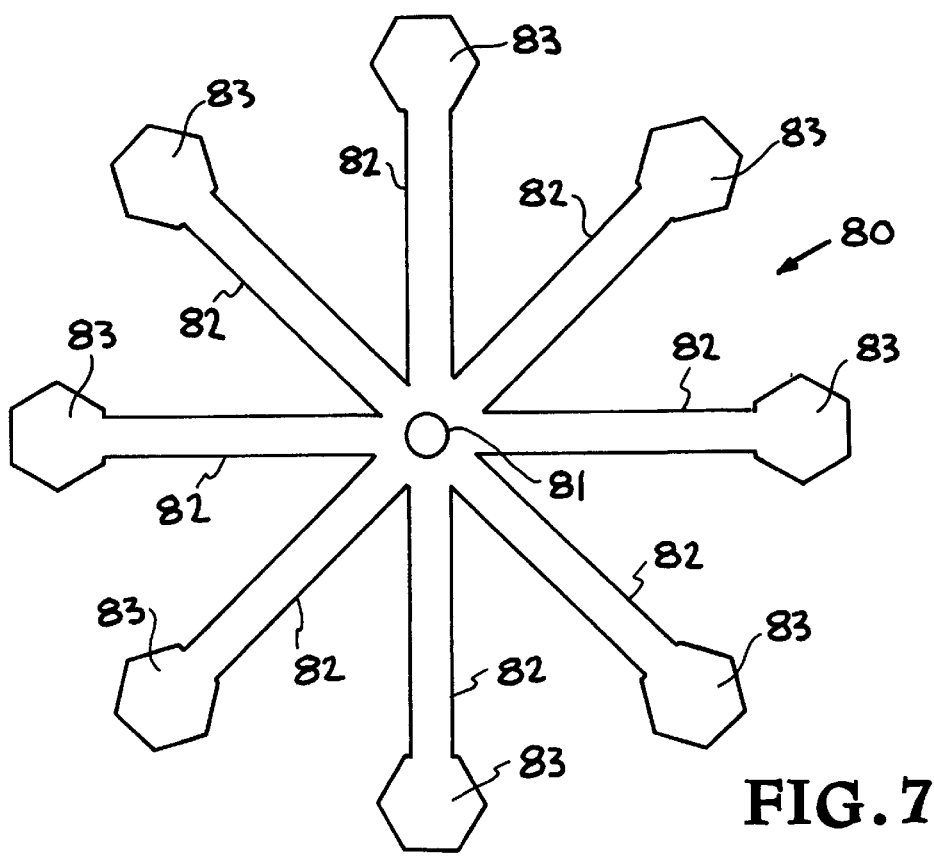
FIG. 7 shows an alternative embodiment of an illumination system according to the present invention, wherein the optical channels are organized in a star-shaped network.

It may be possible to construct even more complex coupling channel structures, e.g. the eight-armed coupling system 80 shown in FIG. 7. Eight arms 82 extend away from a central cavity 81 and terminate at light fixtures 83. However, it may be too difficult to form these more complex geometries. There is an easier way to produce a many waveguide light distribution system using a simpler two-armed or four-armed coupling system. Multiple light distribution optical waveguides or channels may be effectively coupled to each arm of the source coupling system.

The source coupling system can be part of a single waveguide, as shown in FIG. 4B. In illumination system 50 there are only two light distribution waveguides, the two-arms 53*a, b* of waveguide 53. However, it will often be necessary to have many more light distribution waveguides extending to various illumination points, and it is most efficient to use as few sources as possible. If the source coupling system is formed directly in the distribution waveguides themselves, then it will be difficult to have more than two or four distribution waveguides extending from a single source, e.g. by using the structures of FIGS. 4B or 6A. However, by forming the source coupling system as a discrete component to which the separate distribution waveguides can be efficiently coupled, many more distribution waveguides can be coupled to a single source, even using only simple two-arm or four-arm source coupling systems.

As shown in FIG. 5, discrete source coupling channel 66 can be coupled to either a single light distribution waveguide 75 or to a multichannel light distribution waveguide or waveguide bundle 76. Since the diameter of light distribution waveguides 75, 76 can be matched to the diameter of coupling channel 66, and the ends can be directly abutted together (with a suitable index matching fluid therebetween if necessary) there will be essentially no loss at the interfaces between source coupling channel 66 and waveguides 75, 76. Since most of the light from cavity 67 will already have been trapped in channel 66, the light will be transmitted into and through light distribution waveguides 75, 76 to the respective illumination points.

Figure 6A:
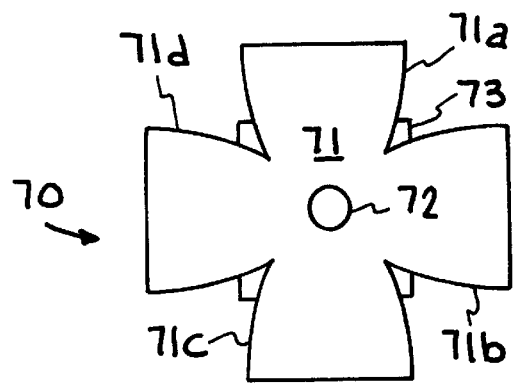
FIG. 6A shows a four-arm light source coupling system of the invention.
Figure 6B:
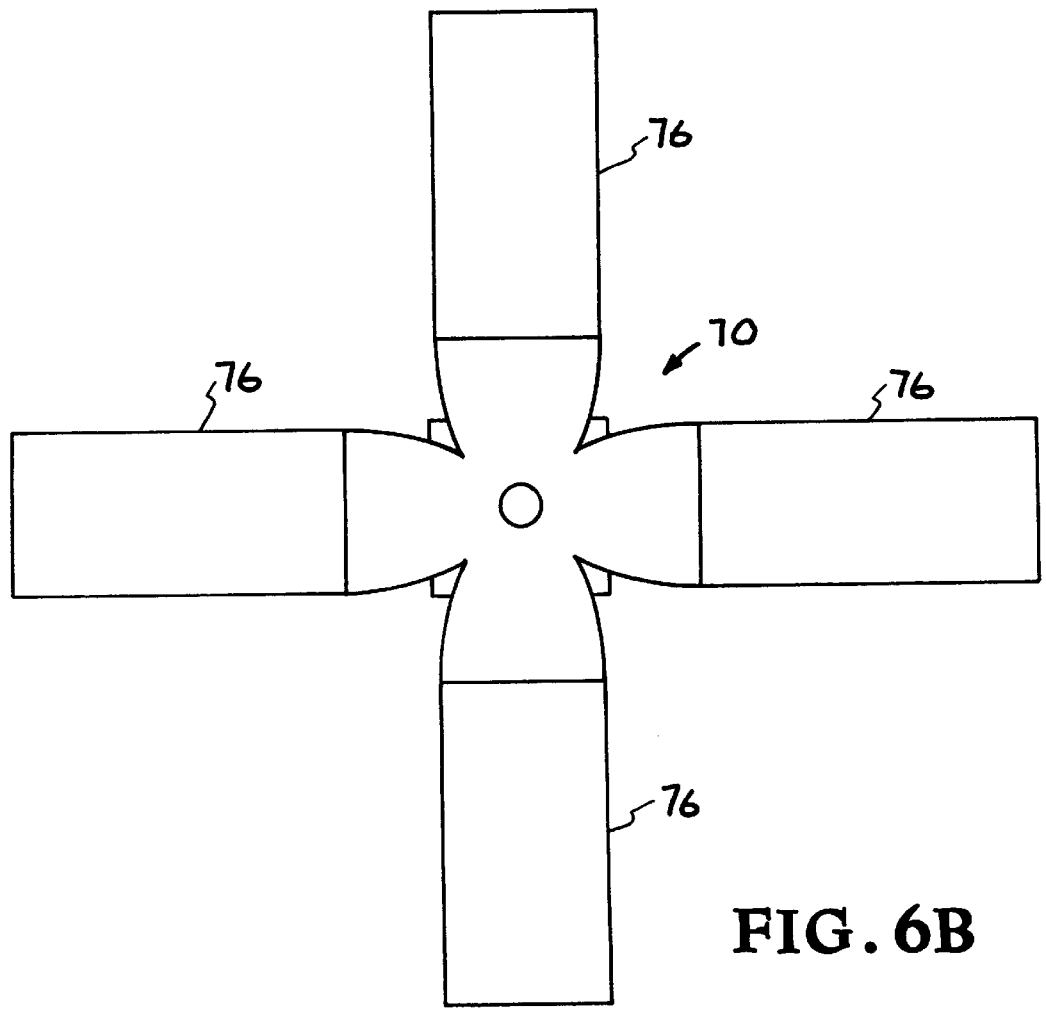
FIG. 6B shows the coupling system of FIG. 6A coupled to bundles of distribution waveguides.

Likewise FIG. 6B shows four multichannel light distribution waveguides (waveguide bundles) 76 connected to the arms of the four-way source coupling system 70 of FIG. 6A. If each bundle contains seven separate waveguides, e.g. optical fibers or light pipes, a total of 28 separate waveguides can be connected to the four-arm source coupling system 70.

Figure 8A:
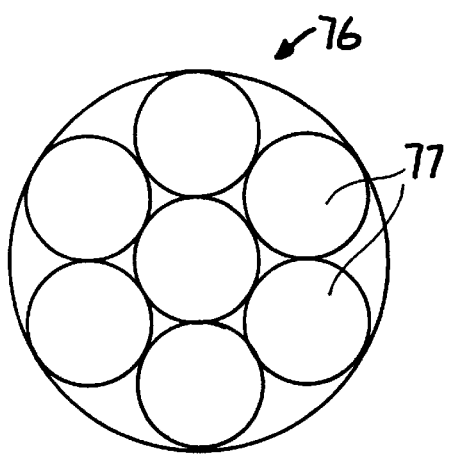
FIG. 8A is a cross-section of a bundle of cylindrically shaped distribution waveguides.

FIG. 8A shows a multichannel light distribution waveguide bundle 76 formed of seven separate distribution waveguides 77. Of course any number of waveguides may be used, but since they will pack in a hexagonal configuration, certain numbers of waveguides may be more effectively coupled to the source coupling system. Even with the tight packing of the waveguides 77, there will be spaces between the waveguides which will lead to losses. To even further maximize coupling efficiency, the waveguides could be hexagonal shaped so there will be no space. While it may be more difficult (and costly) to manufacture waveguides which are hexagonal instead of cylindrical, particularly over their entire length, it is really only necessary to achieve this configuration near the interface with the source coupling system.

Figure 8B:
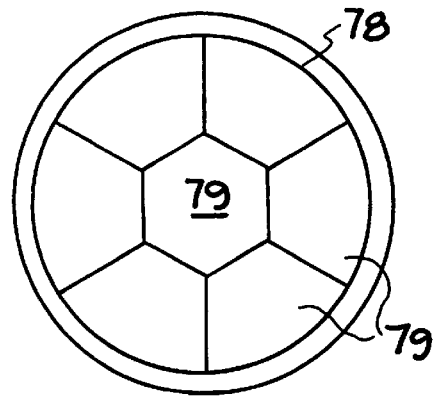
FIG. 8B is a cross-section of a bundle of hexagonally shaped or near hexagonally shaped distribution waveguides.

Thus if waveguides 77 of FIG. 8A are made of a flexible material, e.g. plastic, which is likely for the distribution waveguides, they can be forced into a better packing configuration by the application of pressure. For example, a collar 78 can be positioned around a bundle of cylindrical waveguides near the coupling interface. By tightening the collar 78, the ends of waveguides 77 can be forced in hexagonal or near hexagonal shapes to produce waveguides 79, as shown in FIG. 8B.

Changes and modifications in the specifically described embodiments can be carried out without departing from the scope of the invention which is intended to be limited only by the scope of the appended claims.

What is claimed is:

1. A source coupling system for an optical waveguide illumination system, comprising:

a source optical channel which guides light by total internal reflection;

a cavity formed in the source optical channel;

a light source disposed inside the cavity; and a light source driving circuit operatively connected to the light source;

whereby light from the light source is contained within the source optical channel by total internal reflection.

2. The source coupling system of claim 1, wherein the source optical channel is made of quartz, glass, or plastic.

3. The source coupling system of claim 1, wherein the light source is a high-density discharge (HID) light source.

4. The source coupling system of claim 3, wherein the HID light source is an electrodeless light source.

5. The source coupling system of claim 3, wherein the HID light source is a mercury light source, a metal halide source, a high-pressure sodium lamp, a xenon lamp, or a sulfur lamp.

6. The source coupling system of claim 3 wherein the source optical channel is formed of a material which is stable in the presence of high temperatures generated by the HID light source.

7. The source coupling system of claim 1, wherein the cavity is a spherical cavity.

8. The source coupling system of claim 1, wherein the cavity is an elliptical cavity.

9. The source coupling system of claim 1, wherein the light source driving circuitry includes an induction system.

10. The source coupling system of claim 9, wherein the light source driving circuitry includes a ballast connected to the induction system to limit the current through the induction system and the temperature of the light source to pre-selected levels.

11. The source coupling system of claim 1, wherein the cavity is shaped to produce an anisotropic distribution of source light to increase the amount of light that is totally internally reflected in the source optical channel.

12. The source coupling system of claim 1, wherein the source optical channel is shaped to increase the amount of light that is totally internally reflected in the source optical channel.

13. The source coupling system of claim 1, wherein the source optical channel is a portion of a light distribution waveguide.

14. The source coupling system of claim 1, wherein the source optical channel is a discrete component to which light distribution waveguides are coupled.

15. The source coupling system of claim 1, wherein the source optical channel has two arms extending from the cavity.

16. The source coupling system of claim 1, wherein the source optical channel has four arms extending from the cavity.

17. An optical waveguide illumination system, comprising:

a source coupling system of claim 1;

a plurality of light distribution waveguides extending from the source coupling system to illumination points.

18. The optical waveguide illumination system of claim 17 wherein the light distribution waveguides are multichannel waveguides comprising a bundle of separate waveguides.

19. An optical waveguide illumination system, comprising:

a source coupling system of claim 14;

a plurality of light distribution waveguides extending from the source coupling system to illumination points.

20. The optical waveguide illumination system of claim 19 wherein the light distribution waveguides are multichannel waveguides comprising a bundle of separate waveguides.

* * * * *